(12) United States Patent
Hareyama

(10) Patent No.: US 6,703,438 B2
(45) Date of Patent: Mar. 9, 2004

(54) ELECTROCONDUCTIVE PLATE-LIKE TITANIA AND ELECTROCONDUCTIVE COMPOSITION

(75) Inventor: Yukiya Hareyama, Tokushima (JP)

(73) Assignee: Otsuka Kagaku Kabushiki Kaisha, Osaka (JP)

( * ) Notice: Subject to any disclaimer, the term of this patent is extended or adjusted under 35 U.S.C. 154(b) by 310 days.

(21) Appl. No.: 09/960,928

(22) Filed: Sep. 25, 2001

(65) Prior Publication Data

US 2002/0058141 A1 May 16, 2002

(30) Foreign Application Priority Data

Sep. 27, 2000 (JP) ........................................ 2000-294280

(51) Int. Cl.$^7$ ................................................. C08K 3/22
(52) U.S. Cl. .................... 524/497; 524/495; 423/81; 423/364; 423/403; 423/445 R; 423/598; 423/610
(58) Field of Search ............................ 524/497; 423/81, 423/364, 403, 445 R, 598, 610

(56) References Cited

U.S. PATENT DOCUMENTS 6,231,981 B1   5/2001   Hareyama .................... 428/403

FOREIGN PATENT DOCUMENTS

JP   11-228140   8/1999

OTHER PUBLICATIONS

Patent Abstracts of Japan; Publication No. 63–252928; Publication date: Oct. 20, 1988.
Patent Abstracts of Japan; Publication No. 01–215718; Publication date: Aug. 29, 1989.
Patent Abstracts of Japan; Publication No. 11–228140; Publication date: Aug. 24, 1999.

*Primary Examiner*—Edward J. Cain
(74) *Attorney, Agent, or Firm*—Kubovcik & Kubovcik

(57) ABSTRACT

An electroconductive plate-like titania containing at least 10% by weight of titanium nitride and at least 0.1% by weight of carbon component can provide electroconductive parts which are higher and more uniform in electroconductivity.

7 Claims, 1 Drawing Sheet

ELECTROCONDUCTIVE PLATE-LIKE TITANIA AND ELECTROCONDUCTIVE COMPOSITION

BACKGROUND OF THE INVENTION

The present invention relates to an electroconductive plate-like titania and an electroconductive composition.

Electroconductive fillers to be incorporated into a binder such as resins include, for example, potassium titanate fibers and titania fibers which have been imparted electroconductivity by coating the surface of fibers with an electroconductive substance or by bringing about oxygen deficiency or the like due to reductive calcination. These fibers are practically used for antistatic effect, for shielding electromagnetic wave or for preparing electrodes as their raw materials because of their superiority in reinforcing property, dispersibility and electroconductivity.

In recent years, attempts have been made to develop fillers of improved electroconductivity which are capable of imparting the desired electroconductivity by use of a reduced amount of the filler. Among the attempts, a method comprising nitriding titanate fibers for converting part or all of fibers into titanium nitride is excellent because of ability to give high electroconductivity without impairing the fiber strength. More specifically, a method is known in which titania fibers or titania hydrate fibers are heated and reduced at 500 to 1000° C. in a reductive atmosphere containing an ammonia gas to produce an electroconductive acid titanium nitride fibers (JP-A-215718/1989) and a method is also known in which potassium titanate fibers are heated and calcined in an atmosphere of an ammonia gas for producing potassium titanate fibers which are partly converted into titanium nitride (JP-B-27573/1993).

However, the fibers obtained by these methods have the following drawback. Because titanium nitride is exposed at part of fiber surface, the fibers are so hard that they easily wear a forming mold when used as a filler in a binder such as a resin. The electroconductive composition having a binder containing these fibers has the defect that it is inferior in slidability and resistance to wear. Further these methods pose the following problems. It is difficult to adjust the partial pressure of ammonia gas in the atmosphere and the electroconductivity is varied depending on the obtained fibers. Further, since reduction reaction proceeds in preference to nitriding reaction, the reaction requires a longer time in increasing the degree of nitriding, resulting in a likelihood of giving fibers which are collapsed in shape.

To overcome the foregoing problems of the prior art, the present inventor proposed titania fibers whose surfaces at least partly have titanium nitride coated with carbon (JP-A-228140/1999). The titania fibers containing carbon-coated titanium nitride are excellent in reinforcing property and electroconductivity such that the electroconductive composition having a binder containing these fibers is unlikely to wear the forming mold and have high slidability and wear resistance. Hence these fibers are desirable electroconductive fillers. Moreover, the fibers can be produced in a short time at a relatively low temperature. However, the titania fibers containing carbon-coated titanium nitride have a shape like, for example, the core of a propelling pencil, i.e. fibrous shape, which is about 5 to about 100 in average fiber length/average particle diameter (aspect ratio), and are oriented in a specific direction within the binder due to their fibrous shape and shows a characteristic of being different in electroconductivity and mechanical strength (especially mold shrinkage factor) between the values in the orientation direction and a direction vertical thereto.

This characteristic poses no problem when the fibers are used as a material for an electroconductive parts constituting electronic machines currently available.

However, the electroconductive parts constituting electronic machines require a higher and more uniform electroconductivity. Therefore, a further improvement is desired since the current technology is making a remarkable progress in the development of electronic machines of next generation.

On the other hand, plate-like graphite is known as a plate-like electroconductive filler. Nevertheless it is low in electroconductivity, and needs to be used in a large amount to give the desired degree of electroconductivity to the binder. This lowers the mechanical strength of the obtained composition.

An object of the present invention is to provide an electroconductive composition which enables the production of an electroconductive part which is not varied in electroconductivity and mechanical strength (especially mold shrinkage factor) according to the longitudinal or transverse direction of the part.

Another object of the invention is to provide an electroconductive composition which has higher and more uniform electroconductivity and which will not raise any problem when used as a material for electroconductive parts of next-generation electronic machines.

SUMMARY OF THE INVENTION

The present invention relates to an electroconductive plate-like titania containing at least 10% by weight of titanium nitride and at least 0.1% by weight of carbon component.

The invention further relates to an electroconductive composition containing the foregoing electroconductive plate-like titania and a binder.

DETAILED DESCRIPTION OF THE INVENTION

Figure 1:
FIG. 1 is a photograph (×about 1000) of scanning electron microscope (SEM) showing an example of the electroconductive plate-like titania of the invention.

The electroconductive plate-like titania of the invention has usually a markedly low volume resistivity in the range of $10^{-5}$ to $10^{-1} \Omega \cdot cm$, and possesses high electroconductivity. The electroconductive plate-like titania of the invention when incorporated into a binder is not oriented in a specific direction within the binder unlike the fiber and is dispersed irregularly in a certain degree so that the obtained composition is high and uniform in electroconductivity and is uniform in mechanical strength (especially mold shrinkage factor) on a high level. The electroconductive plate-like titania of the invention has ultrafine particles of titanium nitride, carbon and titania suitably dispersed on its surface so that when incorporated into a binder before molding, the titania would be unlikely to mar the forming mold although the titanium nitride is exposed on the surface.

The electroconductive composition of the invention has a markedly low surface resistance, i.e. in the range of $10^{-4}$ to $10^{4} \Omega$, and is excellent in electroconductivity and high in mechanical strength (including molding shrinkage, wear resistance, and sliding characteristic) and will not damage the forming mold. Hence the composition can be used for various purposes which require electroconductivity, e.g. for antistatic effect, shielding of electromagnetic waves or production of electrodes.

The electroconductive plate-like titania of the present invention contains at least 10% by weight, preferably 30 to 80% by weight, of titanium nitride, and at least 0.1% by weight, preferably 1 to 5% by weight, of carbon. When one or both of these components are outside said ranges in respect of the quantity, the desired effects can not be achieved.

The electroconductive plate-like titania of the present invention can be prepared by mixing a plate-like titanic acid compound and a nitrogen-containing organic compound in the form of powder, and heat-treating the mixture in a non-oxidizing atmosphere.

Examples of useful plate-like titanic acid compounds are plate-like titanium dioxide, plate-like titanate and the like.

The plate-like titanium dioxide to be used can be any of those disclosed, for example, in JP-A-67124/1997, U.S. Pat. Nos. 2,958,440 and 2,824,506, JP-A-95617/1998, JP-A-79712/1999, JP-A-259023/1998 and International Laid-Open Publication WO99/11574.

Examples of plate-like titanates are those containing at least one of lithium, potassium, sodium and like alkali metals, calcium, magnesium and like alkaline earth metals. More specific examples are plate-like sodium titanate, plate-like potassium titanate, plate-like potassium lithium titanate, plate-like potassium magnesium titanate and the like. Useful plate-like potassium titanates are, for example, plate-like potassium tetratitanate, plate-like potassium hexatitanate, plate-like potassium octatitanate and the like.

Among them, plate-like potassium magnesium titanate and plate-like potassium lithium titanate are known compounds. For example, according to the disclosure in JP-A-221795/1993, the compound can be prepared by mixing a titanium source such as titanium oxide, rutile ore, titanium hydroxide wet cake, or hydrous titania with a potassium source such as potassium oxide, potassium carbonate or potassium nitrate and a magnesium source such as magnesium hydroxide, magnesium carbonate or magnesium fluoride (or a lithium source such as lithium nitrate or lithium carbonate), adding a suitable amount of potassium chloride, potassium fluoride, potassium molybdate, potassium tungstate or like flux to the mixture, calcining the mixture to 1000 to 1100° C. (825 to 1150° C. in the case of lithium) for 1 to 24 hours, optionally followed by coarsely or finely pulverizing or wet-pulverizing, classifying, filtering and drying the mixture.

Further, plate-like potassium titanate or plate-like sodium titanate can be prepared from the foregoing plate-like potassium magnesium titanate or the like as the raw material. Stated more specifically, plate-like potassium magnesium titanate or the like is treated with an acid to deintercalate the cations between the layers, immersed in a solution of potassium hydroxide to intercalate the potassium ions and is calcined, giving plate-like potassium octatitanate. Useful acids for acid treatment are, for example, sulfuric acid, nitric acid, hydrochloric acid and like mineral acids. The acid treatment can be performed by stirring the mixture until the cations between the layers are substantially completely dissolved out in about 1 mole/liter of an aqueous solution of the acid. The stirring is conducted usually for about 5 to about 8 hours. The plate-like titanate obtained is washed with water and subjected to the step of intercalating the potassium ions. This step can be done by adding potassium hydroxide to a slurry of about 1 to about 30% by weight, preferably about 5 to about 20% by weight, of the above-obtained plate-like titanate, and by stirring the mixture for about 5 to about 10 hours while maintaining the pH of the slurry to 12 to 13. After completion of intercalation, optionally filtration, washing with water, drying and the like may be conducted, and then calcination is effected at 500 to 600° C., giving plate-like potassium octatitanate. When stirring is executed with the pH of the aqueous slurry retained at 13.5 to 14 in the intercalation of potassium ions, plate-like potassium hexatitanate can be obtained. If the pH thereof is retained at 14.5 to 16.3, plate-like potassium tetratitanate can be produced. The plate-like titanic acid compounds can be used either alone or in combination.

Useful nitrogen-containing organic compounds can be any of conventional compounds such as melamine, (meth) acrylamide and dicyandiamide. Among them, melamine is preferred because of high nitriding efficiency. The nitrogen-containing organic compounds can be used alone or optionally in combination. The amount of the nitrogen-containing organic compound to be used is properly selected so that the titanium nitride content and the carbon content in the eventually obtained electroconductive titania fibers are brought to respective specified ranges according to the nitrogen amount and the carbon amount in the compound. The amount of the organic compound to be used is about 10 to about 500 parts by weight, preferably about 100 to about 300 parts by weight, per 100 parts by weight of plate-like titanic acid compound. The nitrogen-containing organic compound is used preferably in a powder form.

The non-oxidizing atmosphere can be any of conventional ones such as those of nitrogen gas, argon gas, ammonia gas or the like among which nitrogen gas is desirable in view of safety and costs.

The heat treatment is performed usually at a temperature higher than the decomposition temperature of the nitrogen-containing organic compound, preferably about 400 to about 1600° C., more preferably about 700 to about 1300° C. The heat treatment is usually completed in about 0.5 to about 24 hours, preferably about 1 to about 5 hours. The heating means can be any of conventional methods such as those using electric furnace, gas furnace, rotary kiln or continuous furnace.

After heat treatment, the steps usually taken may be executed when so required. They include the removal of impurities, adjustment for unity of shape, washing with water, washing with an acid, pulverization and classification.

In this way, the electroconductive plate-like titania containing titanium nitride, carbon and titania is obtained. The term "plate-like" used herein includes the concept of shapes such as "flaky", "scaly" and "mica-shaped". More specifically, the term includes a coin-like shape such as the shape of 1-yen coin, contact lens shape, tile shape and shape of plate for boiled fish paste. It is difficult to specify the shape. Desirable plates are those which are 0.01 to 100 μm, preferably 1 to 20 μm in both average length and average breadth and 0.01 to 5 μm, preferably 0.05 to 1 μm, in average thickness. Among them, desirable are the plates which are 1.0 to 10 times, preferably 1.1 to 5 times, more preferably 1.1 to 3 times, in average length/breadth. FIG. 1 is a photograph (×about 1000) of scanning electron microscope (SEM) showing an example of the electroconductive plate-like titania of the invention.

The electroconductive plate-like titania of the invention, which can be used for various purposes requiring electroconductivity, is generally combined with a binder to provide an electroconductive composition.

Useful binders include, for example, thermoplastic resins, thermosetting resins, inorganic binders and metal-containing organic compounds.

Specific examples of the thermoplastic resin are polyethylene, polypropylene, polyisoprene, chlorinated polyethylene, polyvinyl chloride, polybutadiene, polystyrene, impact-resistant polystyrene, acrylonitrile-styrene resin (AS resin), acrylonitrile-butadiene-styrene resin (ABS resin), methyl methacrylate-butadiene-styrene resin (MBS resin), methyl methacrylate-acrylonitrile-butadiene-styrene resin (MABS resin), acrylonitrile-acrylic rubber-styrene resin (AAS resin), acrylic resin, polyester (polyethylene terephthalate, polybutyrene terephthalate, polyethylene naphthalate, etc.), polycarbonate, polyphenylene ether, modified polyphenylene ether, aliphatic polyamide, aromatic polyamide, polyphenylene sulfide, polyimide, polyether ether ketone, polysulfone, polyarylate, polyether ketone, polyether nitrile, polythioether sulfone, polyether sulfone, polybenzimidazole, polyamideimide, polyether imide, polyacetal and liquid crystal polymer. The thermoplastic resins can be used alone or optionally in combination.

Specific examples of the thermosetting resin are polyurethane, phenol resins, melamine resins, urea resins, unsaturated polyester resins, diallylphthalate resins, silicone resins and epoxy resins (bisphenol A epoxy resins, bisphenol F epoxy resins, phenol novolak epoxy resins, cresol novolak epoxy resins, cyclic aliphatic epoxy resins, glycidyl ester epoxy resins, glycidylamine epoxy resins, heterocyclic epoxy resins, urethane modified epoxy resins and brominated bisphenol A epoxy resins). These thermosetting resins can be used alone or optionally in combination.

Examples of inorganic binders are those produced by curing one or a mixture of silicate, phosphate, borate and like inorganic curable substances, precursors thereof or hydrates by means of heat, light, electron rays or catalysts to give insoluble, non-meltable, or plastic binders. These inorganic binders can be used either alone or in combination.

Examples of the metal-containing organic compound are organic silicon compound, organic titanium compound, organic phosphorus compound and organic boron compound. These metal-containing organic compounds can be used either alone or in combination.

The proportion of the electroconductive plate-like titania relative to the binder is not specifically limited and can be suitably selected from a wide range according to conditions such as the purposes of the electroconductive resin composition to be produced and the kind of the binder. Usually per 100 parts by weight of the binder, the electroconductive plate-like titania is used in an amount of 10 to 1000 parts by weight, preferably 30 to 900 parts by weight, more preferably 50 to 400 parts by weight.

The electroconductive resin composition of the invention may contain at least one of resin additives within the range which would not adversely affect its high electroconductivity, such as other electroconductive materials, inorganic fillers, pigments, organic solvents, antioxidants, antistatic agents, mold releasing agents, lubricants, heat stabilizers, flame retardants, dripping inhibitors, UV absorbers, light stabilizers, light screens, metal inactivators, antiaging agents, plasticizers, impact strength improvers and compatibilizers. Further, the electroconductive plate-like titania of the invention may be surface-treated with a coupling agent such as silane coupling agents and titanium coupling agents.

The electroconductive composition of the invention can be prepared by mixing or kneading a binder in the conventional manner with specific or proper amounts of the electroconductive plate-like titania and optionally other resin additives. For example, powders, beads, flakes or pellets of respective components are mixed or kneaded by a single screw extruder, a twin screw extruder or like extruders, Banbury mixer, pressure kneader, twin roll or like kneaders. The composition can be molded into moldings in the desired shape by conventional molding means such as press molding, injection molding or extruding molding. Optionally the composition may be formulated in the form of adhesives, coating compositions, inks or paste according to the purpose.

The electroconductive composition of the invention can be used for specific purposes which require electroconductivity by properly selecting the binder serving as a matrix and other components according to the purposes. More specifically, the electroconductive composition of the invention can be used for: displays, personal computers, word processors, CD players, MD players, DVD players, headphone stereo, portable telephones, PHS, PDA (personal digital assistants such as electronic pocket notebooks), transceivers, video cameras, digital cameras, cameras and like electric or electronic machines, housing or coating compositions for pinball machines and the like, structural parts therefor (belts, bearings for rotary members, carrier tapes, reels for carrier tapes, reels for magnetic tapes, etc.), packaging materials (bags, trays, magazines, containers, etc.), touch panels for personal computers, word processors, portable terminals, electronic pocket notebooks, etc., housing of electron photograph copying machines, printers, facsimile machines, etc., structural parts therefor (belts, rolls, bearings for rotary parts, etc.), sheets, films, trays, carriers, wafer baskets, packages and the like for use in transporting IC, LSI and like semi-conductor elements, electroconductive working tables for use in transporting electronic machine parts and precision machine parts, connectors and anisotropy electroconductive films for flat package type IC, leadless chip carrier type IC and flexible printed boards, electroconductive paste for electrical contact of printed circuit boards, for via-holes or through-holes or for formation of patterns, electroconductive paste for ceramic structures of inductors, condensers, resonaltors or the like, antistatic films for LCD, electrochromic, electroluminescence, solar batteries, modulated light films, optical shutters and like display electronic parts, adhesives for mounting semi-conductor elements or light emitting diodes, leakage electromagnetic wave shielding films, coating compositions, paste and electrodes for display devices such as CRT (cathode ray tube), LCD (liquid crystal display), PDP (plasma display) or the like, terminal electrodes for electronic parts such as multilayer ceramic capacitors, laminated inductors, piezo-electric materials, resistors, printed circuit boards or the like, electrodes for batteries or battery coating compositions for film batteries, solar batteries, secondary batteries or the like, jigs for semi-conductor devices or for production of electronic parts, separative claws for image-forming devices, electroconductive transfer tapes for adhering an electron contact or for electromagnetic screening, digitizer tablets, pressure resistance converting elements, pressure volume converting elements, flat cables, gaskets, floor materials for clean rooms, food hygiene rooms, hospital-measuring rooms, fuel tanks, gears for weak current, pulleys, hair brushes, hoses for organic solvents, coating compositions for welding contact, magnetic tapes, insulating cables for power, cables for direct current, compounds for cable-shielding laminate or adhesives therefor, PTC elements, electroconductive paper, electroconductive non-woven fabrics, antistatic gloves, etc. The electroconductive compositions of the invention are usable for heat conductive or heat radiating compounds, coating compositions, paste, adhesives and sheets. Fabrics formed of fibers produced by spinning the electroconductive composition of the invention can be used, e.g. for producing carpets, mats, sheets or materials for internal decorations for automobiles and like transporting machines or furniture; electroconductive wears or filters; dryer belts for use in producing paper napkins, sanitary napkins and like sanitary products; and dryer canvasses for paper-manufacturing machines.

The present invention will be described in more detail with reference to the following reference example, example and comparative examples. In the Example, the values of properties were measured by the following methods.

(1) Volume Resistivity

A 0.5 g quantity of powdery sample was packed into a cylindrical container made of polyacetal. The sample was compressed by a rod made of copper and having the same diameter as the cylinder serving as the electrode from upper and lower sides with a pressure of 100 kg/cm$^2$, whereby the resistance value R ($\Omega$) was calculated from the current value and the voltage value between the upper and lower electrodes, and the volume resistivity $\rho$ ($\Omega \cdot$cm) was calculated from the thickness of the sample offered for measurements and the area of electrode according to the following equation:

$$\text{Volume resistivity} = \text{resistance}(\Omega) \times [\text{area of electrode (cm}^2)/\text{thickness of sample (cm)}]$$

(2) Surface Resistance ($\Omega$)

A coating film was formed by the method of Example and the surface resistance was evaluated by a measuring device. The measuring device was "High Rester IP" manufactured by Mitsubishi Chemical Corp. (for evaluation of high resistance value: $10^4$ to $10^{12}\Omega$) and "Low Rester GP" (for evaluation of low resistance value: $10^{-5}$ to $10^7\Omega$).

(3) Mold Shrinkage Factor (Vs) of Molded Product

The mold shrinkage factor (Vs) was calculated from the following equation based on the size of the molded product (Mf) and the size of the mold (Mw) measured 24 hours after molding, according to DIN-16901.

$$\text{Mold shrinkage (\%)} = (Mw - Mf)/Mw \times 100$$

In view of the anisotropy in molding operation, Example and Comparative Examples show the values obtained by dividing, by 2, the difference between the values in the direction of flow in resin molding operation and its vertical direction.

(4) Length, Breadth and Thickness

The average length was measured by a laser diffraction particle size distribution measuring apparatus, and the average breadth and thickness were measured by a scale while observing the sample under a scanning electron microscope ($\times$1000 to 10000) (SEM).

(5) Elementary Analysis

The C content (%) and the TiN content (%) were calculated based on the values obtained by an elementary analyzer (trade name: CHN coder, product of Yanagimoto Seisakusho).

Reference Example 1

There were thoroughly mixed 13 kg of powdery anatase titanium oxide, 6.06 kg of potassium carbonate, 2.46 kg of magnesium hydroxide, 8.48 kg of potassium chloride and 3 liters of water using a Henschel mixer. Then the mixture was compressed under a pressure of 19.6 MPa (200 kgf/cm$^2$) to produce a molded product in the form of brick, each weighing about 3 kg. The molded product was calcined by a tunnel kiln. The calcination was conducted by elevating the temperature at a rate of 5° C./min to 1050° C. After maintaining the molded product for 3 hours, it was cooled to room temperature at a rate of 5° C./min.

The obtained calcined product was coarsely crushed by a jaw crusher and finely pulverized by a pin mill into particles of several millimeters at largest. Then, the particles were dispersed in water to obtain a 10% aqueous slurry, which was stirred with propeller blades for 1 hour and subjected to wet pulverization. Thereafter the slurry was passed through a 50 mesh sieve for classification. The powder left on the sieve was subjected to wet pulverization again for classification. After centrifuging, the powder was dried to produce 15.46 kg of plate-like potassium magnesium titanate ($K_{0.8}$ $Mg_{0.4}$ $Ti_{0.6}$ $O_4$).

The total amount of plate-like potassium magnesium titanate ($K_{0.8}$ $Mg_{0.4}$ $Ti_{0.6}$ $O_4$) was dispersed in a solution of 15.68 kg of 70% sulfuric acid in 293.52 liters of water, giving a 5% slurry. The slurry was continuously stirred for about 5 hours with stirring blades after which it was filtered, washed with water and dried, giving 11.97 kg of a plate-like titanic acid ($H_2Ti_2O_5$).

The total amount of plate-like titanic acid obtained in the previous step was dispersed in a solution of 7.41 kg of 85% potassium hydroxide in 112.29 liters of water, giving a 10% slurry. The slurry was continuously stirred for about 5 hours with stirring blades after which it was filtered, washed with water and dried at 110° C. for 2 hours. Thereafter the product was calcined at 500° C. for 3 hours by an electric furnace, giving 13.36 kg of plate-like potassium octatitanate (average length 10 $\mu$m and average thickness 0.5 $\mu$m).

The shape of the product obtained in each step was confirmed by observation under a scanning electron microscope (SEM) and identified by X ray diffraction method and fluorescent X ray analysis.

EXAMPLE 1

To 100 g of plate-like potassium octatitanate prepared in Reference Example 1 was added 250 g of melamine (reagent, product of Wako Pure Chemical Industries, Ltd.), followed by thorough agitation. The mixture was filled into a container of alumina. The container was placed in a high temperature-type atmosphere furnace. After the air in the furnace was fully replaced with nitrogen, the temperature was elevated while continuously flowing nitrogen. Then, the temperature was kept at 1200° C. for 1 hour. Thereafter the product was cooled to room temperature in the furnace while flowing nitrogen. The thus-obtained product was identified as plate-like electroconductive titania containing 50% of TiN and 2% of carbon by elementary analysis. The product was 9 $\mu$m in length, 3 $\mu$m in breadth, and 0.5 $\mu$m in thickness. The product had a volume resistivity of $8 \times 10^{-3}$ ($\Omega \cdot$cm).

Comparative Example 1

Elementary analysis of commercial titanium nitride powder (particle size 1.5 $\mu$m, product of Nihon Shinkinzoku K. K.) shows that the powder contained 95% of TiN, 0.05% of carbon and had a volume resistivity of $1 \times 10^{-3}$ ($\Omega \cdot$cm).

Comparative Example 2

Fibrous potassium titanate (trade name: Tismo D, product of Otsuka Kagaku Kabushiki Kaisha, fiber length 14 $\mu$m and fiber diameter 0.5 μm) was mixed with melamine and heat-treated in a reducing atmosphere in the same manner as in Example 1 after which the mixture retained substantially the same fiber form. Analysis of the thus-obtained product shows that the product contained 40% of TiN and 1.5% of carbon and had a volume resistivity of $9 \times 10^{-3}$ (Ω·cm). Table 1 shows the values of properties in Example and Comparative Examples.

TEST EXAMPLE 1

Each of electroconductive plate-like titania of Example 1, titanium nitride powder of Comparative Example 1, and fibrous potassium titanate of Comparative Example 2 was added to the solid of acryl binder for coating compositions (trade name: Aclose Super FS Clear, solid content 40%, product of Dai Nippon Toryo Co. Ltd.) in a proportion of 50% by weight. The mixture was stirred for mixing. The mixture was deposited and dried on a PET film to give a coating layer of 30 μm in thickness when dried. The surface resistance of the coating layer is shown in Table 2.

Test Example 2

Each of electroconductive plate-like titania of Example 1, titanium nitride powder of Comparative Example 1, and fibrous potassium titanate of Comparative Example 2 was kneaded with a 6,6-nylon resin (trade name "Zytel", product of Du Pont) in a proportion of 40% by weight and the mixture was molded into a molded product. Table 3 shows the surface resistance of the obtained molded product and the mold shrinkage factor thereof.

TABLE 1

|  | Ex.1 electroconductive plate-like titania | Com. Ex. 1 titanium nitride powder | Com. Ex. 2 Fibrous Potassium Titanate |
|---|---|---|---|
| shape | plate-like length 9.0 μm breadth 3.0 μm thickness 0.5 μm | particle average particle size 1.5 μm | Fiber Average fiber diameter 0.5 μm Average fiber length 14 μm |
| TiN content (%) | 50 | 95 | 40 |
| carbon content (%) | 2 | 0.05 | 1.5 |
| volume resistivity (Ω · cm) | $8 \times 10^{-3}$ | $1 \times 10^{-3}$ | $9 \times 10^{-3}$ |

TABLE 2

|  |  | Ex.1 | Com. Ex. 1 | Com. Ex. 2 |
|---|---|---|---|---|
| filler (wt. part) | electroconductive plate-like titania | 50 |  |  |
|  | titanium nitride powder |  | 50 |  |
|  | fibrous potassium titanate |  |  | 50 |
| acryl binder for coating compositions (wt. part) |  | 125 | 125 | 125 |
| surface resistance (Ω) |  | $5 \times 10^1$ | $7 \times 10^5$ | $2 \times 10^1$ |

TABLE 3

|  |  | Ex.1 | Com. Ex. 1 | Com. Ex. 2 |
|---|---|---|---|---|
| Filler (wt. part) | electroconductive plate-like titania | 40 |  |  |
|  | titanium nitride powder |  | 40 |  |
|  | fibrous potassium titanate |  |  | 40 |
| 6,6-nylon resin (wt. part) |  | 60 | 60 | 60 |
| surface resistance (Ω) |  | $7 \times 10^3$ | $4 \times 10^9$ | $3 \times 10^3$ |
| mold shrinkage factor (%) |  | 0.3 | 0.2 | 1 |

The tables show that the titanium nitride powder of Comparative Example 1 was good in volume resistivity and mold shrinkage factor but was markedly poor in surface resistance and that the fibrous potassium titanate of Comparative Example 2 was good in volume resistivity and surface resistance, but was markedly poor in mold shrinkage factor because of orientation in a specific direction due to the fiber shape. In contrast, the product obtained in Example illustrative of the present invention was excellent in all of volume resistivity, surface resistance and mold shrinkage factor.

The present invention can provide an electroconductive composition capable of producing electroconductive parts which are unlikely to be different in electroconductivity and mechanical strength (especially mold shrinkage factor) between the values in the longitudinal direction of the parts and in the transverse direction thereof and also can provide an electroconductive composition which is higher and more uniform in electroconductivity and which will raise no problem when used as a material for electroconductive parts of next-generation electronic machines.

What is claimed is:

1. An electroconductive plate-like titania containing at least 10% by weight of titanium nitride and at least 0.1% by weight of carbon component.

2. The electroconductive plate-like titania according to claim 1 which has an average length and an average breadth in the range of 0.1 to 100 μm, and an average thickness in the range of 0.01 to 5 μm.

3. The electroconductive plate-like titania according to claim 1, wherein the average length/the average breadth is 1.1 or more.

4. The electroconductive plate-like titania according to claim 1 which has a volume resistivity in the range of $10^{-5}$ to $10^{-1}$ Ω·cm.

5. An electroconductive composition containing the electroconductive plate-like titania of claim 1 and a binder.

6. The electroconductive composition according to claim 5, wherein the binder is at least one species selected from the group consisting of thermoplastic resins, thermosetting resins, inorganic binders and metal-containing organic compounds.

7. The electroconductive composition according to claim 5 which has a surface resistance in the range of $10^{-4}$ to $10^4$ Ω.

* * * * *